United States Patent
Kiyo et al.

(10) Patent No.: US 10,579,884 B2
(45) Date of Patent: Mar. 3, 2020

(54) IMAGE PROCESSING DEVICE AND IMAGE PROCESSING METHOD

(71) Applicants: FUJITSU TEN LIMITED, Kobe-shi, Hyogo (JP); TOYOTA JIDOSHA KABUSHIKI KAISHA, Toyota-shi, Aichi-ken (JP)

(72) Inventors: Kouei Kiyo, Kobe (JP); Kohei Maejima, Toyota (JP)

(73) Assignees: FUJITSU TEN LIMITED, Kobe (JP); TOYOTA JIDOSHA KABUSHIKI KAISHA, Toyota (JP)

(*) Notice: Subject to any disclaimer, the term of this patent is extended or adjusted under 35 U.S.C. 154(b) by 82 days.

(21) Appl. No.: 15/155,496

(22) Filed: May 16, 2016

(65) Prior Publication Data
US 2016/0342849 A1 Nov. 24, 2016

(30) Foreign Application Priority Data
May 21, 2015 (JP) .................................. 2015-103861

(51) Int. Cl.
*G06K 9/00* (2006.01)
*G08G 1/16* (2006.01)
(Continued)

(52) U.S. Cl.
CPC ....... *G06K 9/00805* (2013.01); *B60W 40/105* (2013.01); *G01C 21/26* (2013.01);
(Continued)

(58) Field of Classification Search
None
See application file for complete search history.

(56) References Cited

U.S. PATENT DOCUMENTS 7,145,519 B2 * 12/2006 Takahashi .......... G06K 9/00791
345/7
7,925,441 B2 * 4/2011 Maemura .................. B60T 7/22
340/435
(Continued)

FOREIGN PATENT DOCUMENTS

CN 102740056 A 10/2012
JP 2007-104373 A 4/2007
(Continued)

OTHER PUBLICATIONS

Mar. 7, 2017 Office Action issued with Japanese Patent Application No. 2015-103861.
(Continued)

*Primary Examiner* — Shervin K Nakhjavan
(74) *Attorney, Agent, or Firm* — Oliff PLC

(57) ABSTRACT

An image processing device according to an aspect of the embodiment includes a display controller and a determining unit. The display controller generates a synthesized image when viewing a perimeter of a vehicle from a virtual viewpoint based on an image from an image capturing device and causes a display unit to display the synthesized image. The determining unit determines, in a case where a screen other than a virtual viewpoint screen including the synthesized image is displayed on the display unit, whether a switching condition to a notification screen for notifying an occupant of presence of an obstacle is satisfied when the obstacle is detected by a detector. The display controller causes the display unit to display the notification screen obtained by superimposing a predetermined notification image on the virtual viewpoint screen, when the determining unit determines that the switching condition is satisfied.

8 Claims, 8 Drawing Sheets

(51) Int. Cl.

| | |
|---|---|
| *G01S 13/931* | (2020.01) |
| *G01S 15/02* | (2006.01) |
| *B60W 40/105* | (2012.01) |
| *G01S 7/62* | (2006.01) |
| *G01S 7/20* | (2006.01) |
| *G01S 13/87* | (2006.01) |
| *G01S 7/10* | (2006.01) |
| *G01S 15/89* | (2006.01) |
| *G01S 13/86* | (2006.01) |
| *G01S 13/89* | (2006.01) |
| *G01S 15/931* | (2020.01) |
| *G01C 21/26* | (2006.01) |
| *G06T 7/20* | (2017.01) |
| *G06T 11/60* | (2006.01) |
| *G01S 13/93* | (2020.01) |

(52) U.S. Cl.
CPC ............... *G01S 7/10* (2013.01); *G01S 7/20* (2013.01); *G01S 7/6218* (2013.01); *G01S 7/6281* (2013.01); *G01S 13/867* (2013.01); *G01S 13/87* (2013.01); *G01S 13/89* (2013.01); *G01S 13/931* (2013.01); *G01S 15/025* (2013.01); *G01S 15/89* (2013.01); *G01S 15/931* (2013.01); *G06K 9/00335* (2013.01); *G06T 7/20* (2013.01); *G06T 11/60* (2013.01); *G08G 1/165* (2013.01); *G08G 1/166* (2013.01); *G08G 1/167* (2013.01); *G08G 1/168* (2013.01); *G01S 2013/9364* (2013.01); *G01S 2013/9375* (2013.01); *G01S 2013/9378* (2013.01); *G01S 2013/9385* (2013.01); *G01S 2015/937* (2013.01); *G06T 2207/30261* (2013.01)

(56) References Cited

U.S. PATENT DOCUMENTS

| | | | | |
|---|---|---|---|---|
| 9,975,427 | B2* | 5/2018 | Hisatsugu | B60K 35/00 |
| 10,235,575 | B2* | 3/2019 | Michiguchi | B60R 1/00 |
| 2001/0010540 | A1* | 8/2001 | Ogura | H04N 7/188 |
| | | | | 348/136 |
| 2001/0040534 | A1* | 11/2001 | Ohkawara | G09G 5/00 |
| | | | | 345/7 |
| 2004/0148057 | A1* | 7/2004 | Breed | B60Q 9/008 |
| | | | | 700/242 |
| 2005/0071082 | A1* | 3/2005 | Ohmura | G01C 21/365 |
| | | | | 701/431 |
| 2005/0154505 | A1* | 7/2005 | Nakamura | G01C 21/365 |
| | | | | 701/1 |
| 2006/0287825 | A1* | 12/2006 | Shimizu | B60K 35/00 |
| | | | | 701/516 |
| 2007/0106475 | A1* | 5/2007 | Kondoh | B60K 26/021 |
| | | | | 701/301 |
| 2008/0059054 | A1* | 3/2008 | Yamada | G01C 21/00 |
| | | | | 701/301 |
| 2008/0204208 | A1* | 8/2008 | Kawamata | B60R 1/00 |
| | | | | 340/435 |
| 2009/0009314 | A1* | 1/2009 | Taniguchi | B60R 1/00 |
| | | | | 340/461 |
| 2009/0157268 | A1* | 6/2009 | Chiba | G08G 1/16 |
| | | | | 701/53 |
| 2010/0030474 | A1* | 2/2010 | Sawada | B62D 15/0265 |
| | | | | 701/301 |
| 2010/0063663 | A1* | 3/2010 | Tolstedt | G05D 1/0231 |
| | | | | 701/23 |
| 2010/0194596 | A1* | 8/2010 | Wang | B60R 1/00 |
| | | | | 340/936 |
| 2010/0220189 | A1 | 9/2010 | Yanagi | |
| 2010/0253526 | A1* | 10/2010 | Szczerba | B60K 28/066 |
| | | | | 340/576 |
| 2010/0289634 | A1* | 11/2010 | Ikeda | B60Q 9/005 |
| | | | | 340/441 |
| 2011/0131515 | A1* | 6/2011 | Ono | G01C 21/367 |
| | | | | 715/764 |
| 2011/0234802 | A1* | 9/2011 | Yamada | B60R 1/00 |
| | | | | 348/148 |
| 2011/0301846 | A1* | 12/2011 | Yanagawa | G08G 1/16 |
| | | | | 701/301 |
| 2012/0212612 | A1* | 8/2012 | Imai | G06K 9/00798 |
| | | | | 348/148 |
| 2012/0287282 | A1* | 11/2012 | Kinoshita | B60R 1/00 |
| | | | | 348/148 |
| 2012/0320212 | A1* | 12/2012 | Aimura | B60R 1/00 |
| | | | | 348/148 |
| 2013/0009789 | A1 | 1/2013 | Ichikawa | |
| 2013/0147958 | A1 | 6/2013 | Mitsuta et al. | |
| 2014/0085472 | A1* | 3/2014 | Lu | B60R 1/002 |
| | | | | 348/148 |
| 2014/0347483 | A1* | 11/2014 | Nakanishi | B60R 11/04 |
| | | | | 348/148 |
| 2014/0347485 | A1* | 11/2014 | Zhang | B60R 11/04 |
| | | | | 348/148 |
| 2015/0062141 | A1* | 3/2015 | Hayasaka | B60R 1/00 |
| | | | | 345/581 |
| 2015/0203033 | A1* | 7/2015 | Watanabe | B60R 1/00 |
| | | | | 348/148 |
| 2015/0326829 | A1* | 11/2015 | Kurihara | H04N 7/181 |
| | | | | 348/148 |
| 2018/0032824 | A1* | 2/2018 | Yamamoto | B60R 1/00 |
| 2018/0059798 | A1* | 3/2018 | Matsubara | B60K 35/00 |

FOREIGN PATENT DOCUMENTS

| | | |
|---|---|---|
| JP | 2007-295043 A | 11/2007 |
| JP | 2011118483 A | 6/2011 |
| JP | 2012-227699 A | 11/2012 |
| JP | 2013-190957 A | 9/2013 |
| JP | 2014-129093 A | 7/2014 |

OTHER PUBLICATIONS

Nov. 23, 2016 Extended Search Report issued in European Patent Application No. 16169996.2.

* cited by examiner

FIG.6

| DISPLAY CONDITION | SATISFACTION/UNSATISFACTION (SATISFACTION=1, UNSATISFACTION=0) |
| --- | --- |
| INPUT OPERATION OFF | 1 |
| TELEVISION SCREEN OFF | 1 |
| OTHER THAN SHIFT LEVER P, R | 0 |
| VEHICLE SPEED WITHIN PREDETERMINED RANGE | 1 |

FIG.7

| DISPLAY STOP CONDITION | SATISFACTION/UNSATISFACTION (SATISFACTION=1, UNSATISFACTION=0) |
| --- | --- |
| NOTIFICATION SCREEN DISPLAY | 1 |
| OTHER THAN SHIFT LEVER P, R | 1 |
| OR CONDITION SATISFACTION | 1 |

| STOP OR CONDITION | SATISFACTION/UNSATISFACTION (SATISFACTION=1, UNSATISFACTION=0) |
|---|---|
| DETECTOR SWITCH OFF | 1 |
| NO OBSTACLE DETECTION FOR PREDETERMINED TIME | 1 |
| VEHICLE SPEED BELOW FIRST SPEED FOR PREDETERMINED TIME | 0 |
| VEHICLE SPEED LARGER THAN THIRD SPEED | 0 |

IMAGE PROCESSING DEVICE AND IMAGE PROCESSING METHOD

CROSS-REFERENCE TO RELATED APPLICATION

This application is based upon and claims the benefit of priority of the prior Japanese Patent Application No. 2015-103861, filed on May 21, 2015, the entire contents of which are incorporated herein by reference.

FIELD

The embodiment discussed herein is directed to an image processing device and an image processing method.

BACKGROUND

There is known a conventional apparatus that detects an obstacle located at a blind spot of a driver by using an obstacle sensor mounted on a vehicle and notifies a driver of the detected obstacle. When detecting an obstacle, the apparatus notifies the driver of the obstacle by performing display switching (see Japanese Laid-open Patent Publication No. 2013-190957, for example).

However, when display switching is performed every time an obstacle is detected like the conventional apparatus, the apparatus notifies a driver of an obstacle even when it is not required that the driver is notified of the obstacle. As described above, the conventional apparatus cannot appropriately notify a driver of an obstacle in some cases.

SUMMARY

An image processing device according to an aspect of the embodiment includes a display controller and a determining unit. The display controller generates a synthesized image when viewing a perimeter of a vehicle from a virtual viewpoint based on an image from an image capturing device and causes a display unit to display the synthesized image. The determining unit determines, in a case where a screen other than a virtual viewpoint screen including the synthesized image is displayed on the display unit, whether a switching condition to a notification screen for notifying an occupant of presence of an obstacle is satisfied when the obstacle is detected by a detector that detects the obstacle around the vehicle. The display controller causes the display unit to display the notification screen obtained by superimposing a predetermined notification image on the virtual viewpoint screen, when the determining unit determines that the switching condition is satisfied.

BRIEF DESCRIPTION OF DRAWINGS

A more complete appreciation of the embodiment and many of the attendant, advantages thereof will be readily obtained as the same becomes better understood by reference to the following detailed description when considered in connection with the accompanying drawings, wherein:

FIG. 6 is a diagram illustrating a display condition table according to the embodiment;

FIG. 7 is a diagram illustrating a display stop condition table according to the embodiment;

DESCRIPTION OF EMBODIMENTS

Hereinafter, an embodiment of an image processing device and an image processing method of the present disclosure will be in detail explained with reference to the accompanying drawings. In addition, the embodiment disclosed below is not intended to limit the present invention.

1. Image Processing Method

Figure 1C:
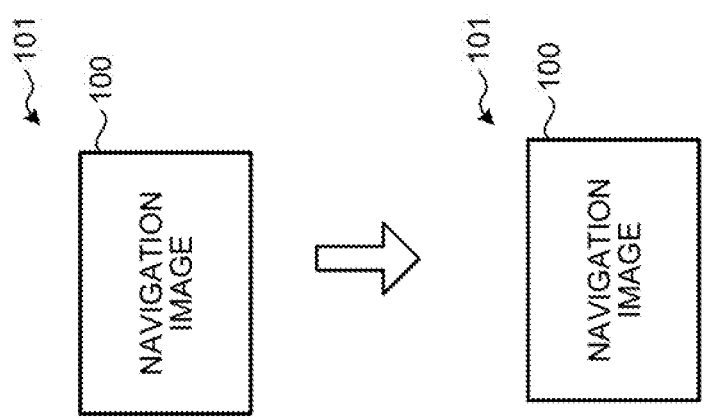
FIG. 1C is a diagram illustrating an example of a screen that is displayed on the display.
Figure 1B:
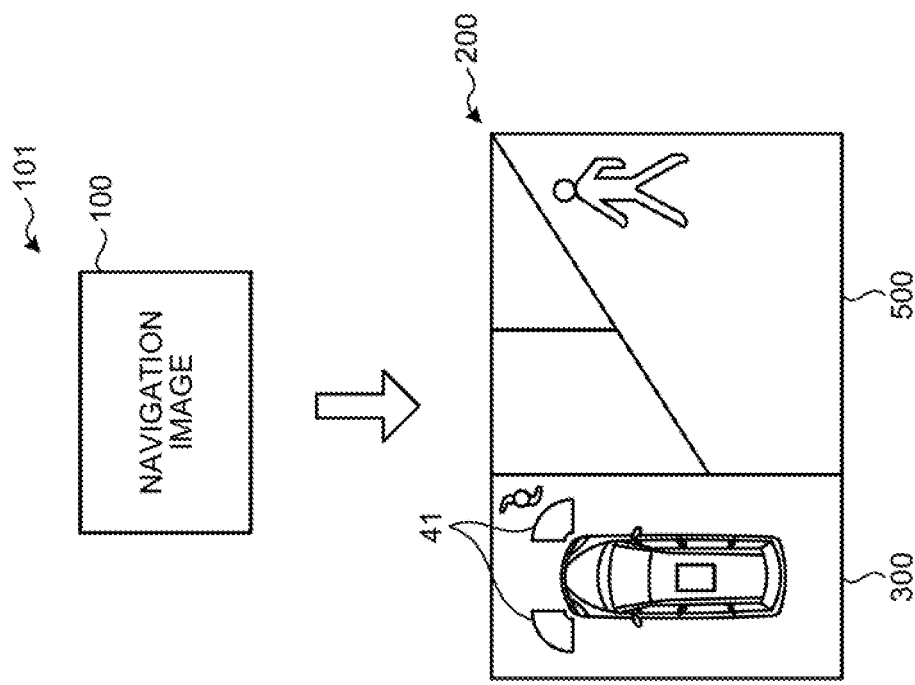
FIG. 1B is a diagram illustrating an example of a screen that is displayed on a display unit.
Figure 1A:
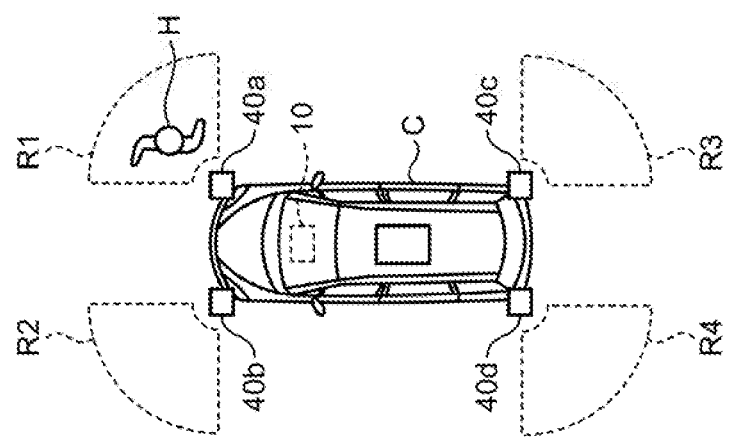
FIG. 1A is a schematic diagram illustrating a positional relationship between a vehicle and an obstacle.

FIGS. 1A to 1C are explanatory diagrams illustrating an image processing method according to an embodiment. The image processing method is performed by an image processing device 10 mounted on a vehicle C, for example. FIG. 1A is a schematic diagram illustrating a positional relationship between the vehicle C and an obstacle. FIGS. 1B and 1C are diagrams illustrating examples of a screen that is displayed on a display unit.

In the image processing method according to the embodiment, a driver is notified of an obstacle by displaying the obstacle detected by detectors 40a to 40d mounted on the vehicle G on a display unit (not illustrated). Herein, although it is explained that the person H is detected as an obstacle, the obstacle is not limited to the person H. For example, an obstacle may be other vehicles such as a bicycle and a motorbike, or may be an electric pole or a tree.

The image processing device 10 generates a synthesized image for the case of viewing the perimeter of the vehicle from a virtual viewpoint, on the basis of a captured image input from an image capturing device (not illustrated) mounted on the vehicle C. The image processing device 10 causes the display unit (not illustrated) to display the generated synthesized image. As described above, the display unit displays a virtual viewpoint screen that includes the synthesized image.

As illustrated in upper parts of FIGS. 1B and 1C, for example, the display unit displays an image 100 (hereinafter, navigation image) that includes a navigational map generated by a navigation device. As described above, the display unit displays a navigation screen 101 that includes the navigation linage 100.

Hereinafter, in a case where the navigation screen 101 is, for example, displayed on the display unit as a screen other than a virtual viewpoint screen that includes a synthesized image, it will be explained about an image processing method performed by the image processing device 10 when the person H of an obstacle approaches the vehicle.

The detectors 40a to 40d detecting an obstacle around the vehicle C are mounted on the vehicle C. The detectors 40a to 40d are clearance sonars, for example. The detectors 40a to 40d have predetermined detection ranges R1 to R4 to detect an object located in the detection ranges R1 to R4 as an obstacle. In FIG. 1A, the detector 40a detects the person H located in the predetermined detection range R1 as an obstacle.

In a case where the navigation screen 101 is displayed on the display unit, the image processing device 10 determines whether a switching condition to a notification screen 200 is satisfied when the person H is detected by the detector 40a. The notification screen 200 is a screen for notifying the driver of the presence of the person H that is an obstacle.

For example, in a case where the navigation screen 101 is displayed on the display unit as illustrated in upper parts of FIGS. 1B and 1C, changing the display of the display unit to the notification screen 200 by the image processing device 10 results in obstructing an operation of the driver when the driver is operating the navigation device. Therefore, the image processing device 10 employs, for example, the presence or absence of an operation for the navigation device as a switching condition. When an operation is not performed on the navigation device, the image processing device 10 switches from the navigation screen to the notification screen 200. On the other hand, when an operation is performed on the navigation device, the image processing device 10 does not switch from the navigation screen to the notification screen.

When it is determined that the switching condition is satisfied, namely, an operation is not performed on the navigation device, the image processing device 10 causes the display unit to display the notification screen 200. As illustrated in the lower part of FIG. 1B, for example, the notification screen 200 is a screen that includes a synthesized image 300 and a captured image 500. The synthesized image 300 is obtained by superimposing a predetermined notification image 41 on a virtual viewpoint image.

On the other hand, when it is determined that the switching condition is not satisfied, namely, an operation is performed on the navigation device, the image processing device 10 does not notify the driver of an obstacle even when the detector 40a detects the person H as the obstacle. Therefore, as illustrated in the lower part of FIG. 1C, the navigation screen 101 including the navigation image 100 is continuously displayed on the display unit.

As described above, in a case where a screen other than a virtual viewpoint screen is displayed on the display unit, the image processing device 10 changes the display of the display unit to the notification screen 200 when the switching condition to the notification screen 200 is satisfied. As a result, the image pro-ceasing device 10 can appropriately notify a driver of an obstacle in the case of requiring a notification. It should be noted that employing the presence or absence of an operation for a navigation device as described above as a switching condition is only an example. The image processing device 10 can determine whether switching to the notification screen 200 is performed on the basis of a condition other than the switching condition. Hereinafter, it will be further explained about a perimeter monitoring system 1 that includes the image processing device 10.

2. Perimeter Monitoring System

Figure 2:
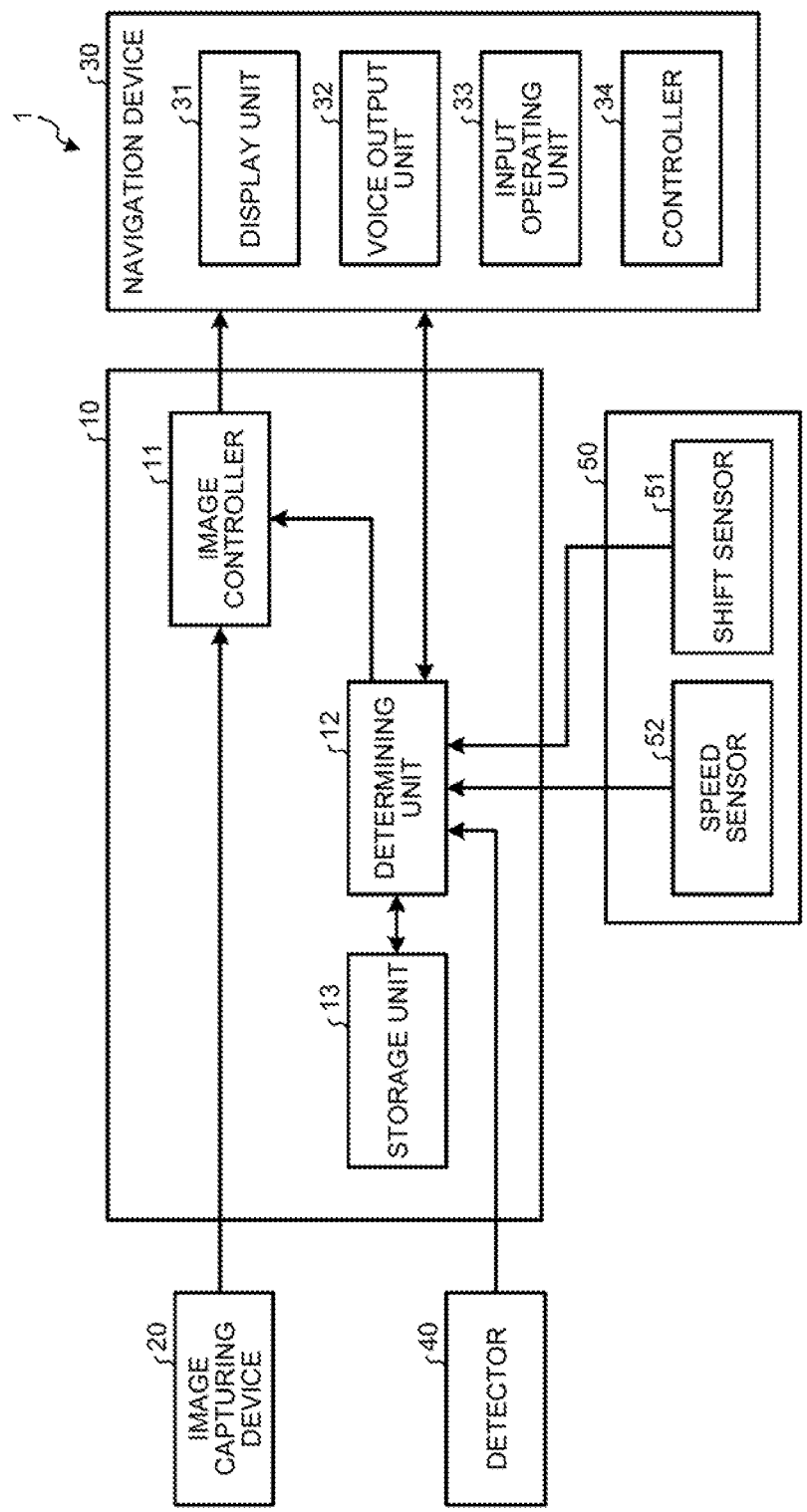
FIG. 2 is a diagram illustrating a configuration example of a perimeter monitoring system according to an embodiment.

FIG. 2 is a diagram illustrating a configuration example of the perimeter monitoring system 1 according to the embodiment. As illustrated in FIG. 2, the perimeter monitoring system 1 includes the image processing device 10, an image capturing device 20, a navigation device 30, a detector 40, and a sensor assembly 50.

2.1 Image Capturing Device

Figure 3:
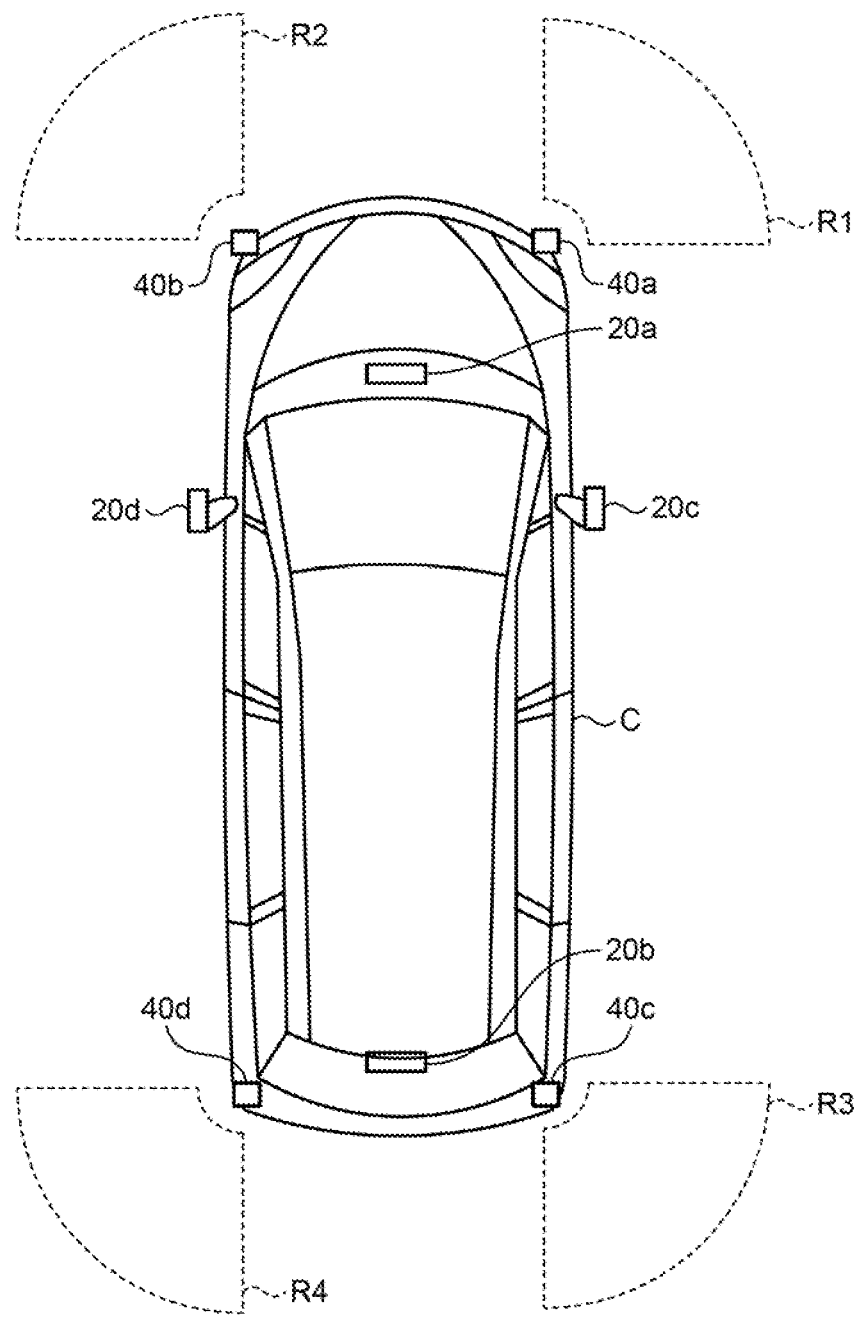
FIG. 3 is a diagram illustrating an arrangement example of an image capturing unit according to the embodiment.

As illustrated in FIG. 3, the image capturing device 20 includes a front image capturing unit 20a that is placed in the front of the vehicle C, a rear image capturing unit 20b that is placed in the rear of the vehicle C, a right-image capturing unit 20c that is placed in the right side of the vehicle C, and a left image capturing unit 20d that is placed in the left side of the vehicle C. FIG. 3 is a diagram illustrating an arrangement example of the image capturing units 20a to 20d.

The image capturing units 20a to 20d include image capturing elements such as a Charge Coupled Device (CCD) and a Complementary Metal Oxide Semiconductor (CMOS), and outputs images (hereinafter, captured images) around the vehicle C captured by the image capturing elements to the image processing device 10. Moreover, the image capturing units 20a to 20d capture respective images whose imaging directions are front, rear, right, and left directions of the vehicle C.

The image capturing units 20a to 20d employ wide angle lenses such as fisheye lenses. Each of the image capturing units 20a to 20d has an angle of view of which the size is not less than 180 degrees. By using the image capturing units 20a to 20d, the entire perimeter of the vehicle C can be captured.

2.2 Navigation Device

The navigation device 30 illustrated in FIG. 2 includes a display unit 31, a voice output unit 32, an input operating unit 33, and a controller 34. The navigation device 30 has a navigation function and an audio function when a driver of the vehicle C is driving. Moreover, the navigation device 30 outputs, to the image processing device 10, information on a screen displayed on the display unit 31 and information on an input operation received by the input operating unit 33.

The display unit 31 includes a Liquid Crystal Display (LCD). The display unit 31 displays, for example, the navigation image 100 (see FIG. 1) and an image (hereinafter, television image) based on television broadcasting signals in accordance with an instruction of the controller 34. Moreover, the display unit 31 displays a captured image, a virtual viewpoint image, or a synthesized image, as described later.

The voice output unit 32 includes a speaker. The voice output unit 32 outputs, for example, voice guidance for the navigation function and voices based on television broadcasting signals in accordance with an instruction of the controller 34. Moreover, the input operating unit 33 receives an input operation that is performed by an operator with respect to the navigation device 30. Moreover, when the display unit 31 is for example a touch-screen display, the display unit 31 may have a function of the input operating unit 33.

The controller 34 controls the units included in the navigation device 30. The controller 34 causes the display unit 31 to display a predetermined image or causes the voice output unit 32 to output audio data, on the basis of an input operation received by the input operating unit 33, for example.

2.3 Detector

As illustrated in FIG. 3, the detector 40 includes the right front detector 40a placed in the right front of the vehicle C, the left front detector 40b placed in the left front of the vehicle C, the right rear detector 40c placed in the right rear of the vehicle C, and the left rear detector 40a placed in the left rear of the vehicle C.

The detectors 40*a* to 40*d* are clearance sonars. The detectors 40*a* to 40*d* detect objects located in the detection ranges R1 to R4 of the respective clearance sonars as obstacles. Each of the detectors 40*a* to 40*d* notifies the image processing device 10 of the detected obstacle. It should be noted that the detectors 40*a* to 40*d* are not limited to ultrasonic sensors such as for example clearance sonars. The detectors 40*a* to 40*d* may be radio-wave sensors such as for example millimeter wave radars.

The arrangement of the detector 40 is not limited to the example illustrated in FIG. 3. Like a back sonar for example, the detector 40 may be provided in the rear of the vehicle C. Furthermore, the number of the detectors 40*a* to 40*d* may foe four or more.

2.4 Sensor Assembly

The sensor assembly 50 includes various types of sensors, such as a shift sensor 51 and a speed sensor 52, which detect the state of the vehicle C. The shift sensor 51 detects the position of a shift lever (not illustrated). The position of the shift lever includes "parking" in which the vehicle C is perfectly stopped and "reverse" in which the vehicle C moves backward. The speed sensor 52 detects a traveling speed (hereinafter, vehicle speed) of the vehicle C. The sensor assembly 50 outputs the detection result of each sensor to the image processing device 10.

2.5 Image Processing Device

The image processing device 10 includes an image controller 11 (equivalent to example of "display controller"), a determining unit 12, and a storage unit 13.

2.5.1 Image Controller

The image controller 11 performs various kinds of image processing with respect to image data acquired from the image capturing device 20, and generates a captured image, a virtual viewpoint image, or a synthesized image to be displayed on the display unit 31.

The image controller 11 acquires captured image data from the image capturing units 20*a* to 20*d*. The image controller 11 selects one or more images from among the captured images of the image capturing units 20*a* to 20*d*, depending on the type of an image to be displayed on the display unit 31. The image controller 11 selects one or more captured, images in accordance with the notification of the determining unit 12.

The image controller 11 performs a coordinate transformation process with respect to the plurality of captured image, and generates a virtual viewpoint image that is an image viewed from a virtual viewpoint. As the coordinate transformation process, the image controller 11 projects (maps), for example, the captured images on a predetermined projection plane, and sets, as the virtual viewpoint image, an image in a predetermined viewing angle area when being viewed from the virtual viewpoint, among the captured images projected on the predetermined projection plane.

For example, the image controller 11 stores a table that indicates a correspondence relationship between the position of data included in the captured images of the image capturing units 20*a* to 20*d* and the position of the predetermined projection plane. By using the table, the image controller 11 projects the data included in the captured images of the image capturing units 20*a* to 20*d* on the corresponding position of the predetermined projection plane.

The predetermined projection plane has, for example, a substantially hemispherical shape (for example, bowl shape). The central area (for example, bottom of bowl) of the hemispherical shape is the position of the vehicle C, and the outside (outer circumferential area of substantially hemispherical shape, for example) of the position of the vehicle C is equivalent to an area around the vehicle C. It should be noted that the predetermined projection plane is not limited to a curved surface. It may be a flat surface, for example.

The image controller 11 generates a synthesized image obtained by superimposing a predetermined notification image on a virtual viewpoint image. For example, the predetermined notification image is an image corresponding to any of the detection ranges R1 to R4 of the detector 40. The image controller 11 generates a synthesized image by superimposing a notification image on the virtual viewpoint image, in which the notification image is an image that indicates a detection range (R1 to R4) in a direction (front or rear direction) in which the detector 40 detects an obstacle.

Figure 4:
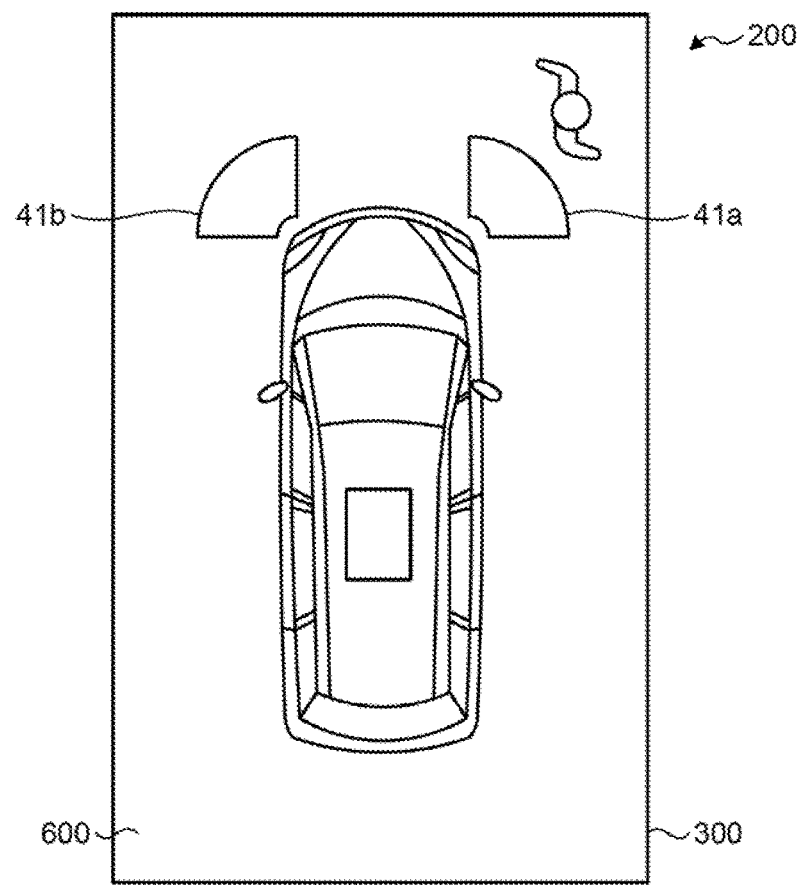
FIG. 4 is a diagram illustrating an example of a synthesized image that is generated from an image controller according to the embodiment.

FIG. 4 is a diagram illustrating an example of a notification screen 200 that is generated from the image controller 11. As illustrated in FIG. 4, when the detector 40 detects the person H located in front of the vehicle C as an obstacle, the image controller 11 generates, as the notification screen 200, the synthesized image 300 obtained by superimposing images 41*a*, 41*b* (notification images) corresponding to the detection ranges R1, R2 of the detectors 40*a*, 40*b* provided, in the front of the vehicle C on a virtual viewpoint image 600.

The images 41*a*, 41*b* on the virtual viewpoint image 600 are not necessarily identical with the actual detection ranges R1, R2. It is sufficient that the synthesized image 300 is an image that indicates where the obstacle exists around the vehicle C. For example, because the notification image may be an arrow, it may not be the images 41*a*, 41*b* corresponding to the detection ranges R1, R2.

Figure 5:
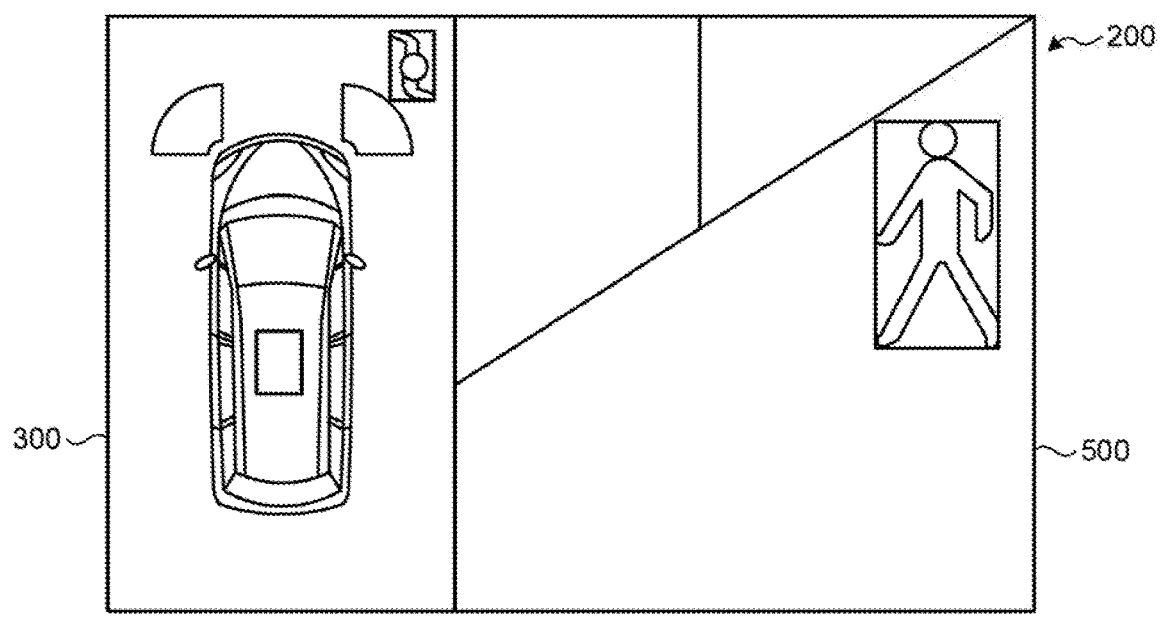
FIG. 5 is a diagram illustrating another example of a synthesized image that is generated from the image controller according to the embodiment.

The notification screen 200 generated from the image controller 11 is not limited to the example illustrated in FIG. 4. For example, as illustrated in FIG. 5, the detected obstacle may be displayed after highlighting is performed by surrounding the obstacle with a frame. In this case, the image controller 11 may generate the notification screen 200 by apposing the synthesized image 300 obtained by superimposing the notification images 41*a*, 41*b* on the virtual viewpoint image and the front captured image 500 in which highlighting is performed on the obstacle.

The positions at which the notification images 41*a*, 41*b* are superimposed on the virtual viewpoint image 600 are not limited to the example illustrated in FIGS. 4 and 5. For example, the image controller 11 may superimpose a notification image on a vehicle image included in the synthesized image 300.

As described above, the image controller 11 generates the synthesized image 300 and the captured image 500 or the virtual viewpoint image 600 in accordance with the notification of the determining unit 12, and causes the display unit 31 to display the image(s).

2.5.2 Determining Unit

In a case where a screen other than the virtual viewpoint screen including the synthesized image 300 is displayed on the display unit 31, the determining unit 12 determines whether a switching condition to the presence of an obstacle is satisfied when the obstacle is detected by the detector 40. When it is determined that the switching condition is satisfied, the determining unit 12 notifies the image controller 11 of the effect that the detection result by the detector 40 and the notification screen 200 are displayed.

When the notification screen 200 is displayed on the display unit 31, the determining unit 12 determines whether a termination condition for terminating the display of the notification screen 200 is satisfied. When it is determined that the termination condition is satisfied, the determining unit 12 notifies the image controller 11 to terminate the display of the notification screen 200.

2.5.2.1 Example of Switching Condition

The determining unit 12 determines whether each of display conditions is satisfied, for example. When all the display conditions are satisfied, the determining unit 12 determines that the switching condition is satisfied. The display conditions will be explained by using FIG. 6. FIG. 6 is a diagram illustrating a display condition table that indicates the satisfaction or unsatisfaction of each display condition.

As described above, a display condition determined by the determining unit 12 includes, as an example, the presence or absence of an input operation with respect to the navigation device 30. For example, when an input operation with respect to the navigation device 30 is not performed until a predetermined time passes after the detector 40 detects an obstacle, the determining unit 12 determines that there is not the input operation.

In other words, the determining unit 12 determines that the condition of "input operation OFF" is satisfied, and sets "input operation OFF" of the display condition table to "1". On the other hand, when the input operation with respect to the navigation device 30 is performed until the predetermined time passes after the detector 40 detects the obstacle, for example, the determining unit 12 determines that there is the input operation, and sets "input operation OFF" of the display condition table to "0".

Herein, the presence or absence of an input operation with respect to the navigation device 30 is determined in a predetermined time after detecting an obstacle. For example, the presence or absence of the input operation may, however, be determined in a predetermined time before detecting an obstacle. In other words, when an input operation with respect to the navigation device 30 is not performed within a predetermined time until before the detector 40 detects an obstacle, for example, the determining unit 12 determines that there is not the input operation.

As an example of the display condition, the determining unit 12 determines whether the display unit 31 is displaying a television screen that includes television images. When the television screen is not displayed on the display unit 31, for example, the determining unit 12 determines that the display condition is satisfied, and sets "television screen OFF" of the display condition table to "1". On the other hand, when the television screen is displayed on the display unit 31, for example, the determining unit 12 determines that the display condition is not satisfied, and sets "television screen OFF" of the display condition table to "0".

As described above, when the television screen is displayed on the display unit 31, it is considered that the driver is watching the television screen and the vehicle C is not driven. In this case, the determining unit 12 determines that the driver may not foe notified of the obstacle and thus the switching to the notification screen 200 is not performed. As a result, the driver can watch television without being obstructed by the notification screen 200. Moreover, when the television screen is not displayed on the display unit, the determining unit 12 can appropriately notify the driver of an obstacle by determining that the switching to the notification screen 200 is performed.

The determining unit 12 determines whether the display condition is satisfied in accordance with the position of the shift lever, for example. Specifically, when the shift lever is located at a position other than parking and reverse, for example, the determining unit 12 determines that the display condition is satisfied, and sets "other than shift lever P, R" of the display condition table to "1". On the other hand, when the shift lever is located at the position of parking or reverse, for example, the determining unit 12 determines that the display condition is not satisfied, and sets "other than shift lever P, R" of the display condition table to "0".

When the shift lever is located at the position of "P", namely, the position of parking, the vehicle C is stopping. In this case, because the vehicle C does not collide against an obstacle, the determining unit 12 determines that the switching to the notification screen 200 is not performed. Therefore, when the vehicle C may collide against the detected obstacle, the determining unit 12 can appropriately notify the driver of the obstacle by determining that the switching to the notification screen 200 is performed.

When the shift lever is located at "R", namely, the position of reverse, it is considered that the vehicle C is moving backward and thus the driver sufficiently pays attention to the perimeter of the vehicle G. Alternatively, the virtual viewpoint screen is displayed on the display unit 31, and the driver is already notified of the obstacle. Therefore, in this case, the determining unit 12 determines that the switching to the notification screen 200 is not performed. As described above, when the driver does not sufficiently pay attention to the perimeter of the vehicle C, or when the driver is not notified of the obstacle, the determining unit 12 can appropriately notify the driver of the obstacle by determining that the switching to the notification screen 200 is performed.

The determining unit 12 determines whether the display condition is satisfied in accordance with the vehicle speed of the vehicle C, for example. Specifically, when the speed of the vehicle C is not less than a first speed Vth1 that is faster than 0 km/h and is not more than a second speed Vth2 that is faster than the first speed Vth1, for example, the determining unit 12 determines that the display condition is satisfied, and sets "vehicle speed within predetermined range" of the display condition table to "1". On the other hand, when the vehicle speed is smaller than the first speed Vth1 or is larger than the second speed Vth2, the determining unit 12 determines that the display condition is riot satisfied, and sets "vehicle speed within predetermined range" of the display condition table to "0"

For example, when the vehicle speed is smaller than the first speed Vth1, the vehicle C is substantially stopping, and thus a collision possibility against an obstacle is small. Moreover, when the vehicle speed is larger than the second speed Vth2, the driver concentrates on the drive of the vehicle. In this case, if the switching to the notification screen 200 is performed, it is concerned that the drive of the driver is obstructed. Therefore, the determining unit 12 determines that the switching to the notification screen 200 is not performed when the vehicle speed is out of the predetermined range. As described above, the determining unit 12 can appropriately notify the driver of an obstacle by determining that the switching to the notification screen 200 is performed when the vehicle speed is within the predetermined range.

When all the display conditions described above are satisfied, for example, namely, all the display conditions of the display condition table are set to "1", the determining unit 12 determines that the switching condition is satisfied. On the other hand, because the condition of "other than shift lever P, R" is "0" in the example illustrated in FIG. 6, it is not determined that all the display conditions are satisfied. The determining unit 12 determines that the switching condition is not satisfied.

Herein, although four display conditions are illustrated, display conditions are not limited to four. For example, when the navigation device 30 is performing voice guidance, the determining unit 12 may determine that the switching to the notification screen 200 is not performed because it is concerned that the guidance of the navigation device 30 is obstructed. The number of display conditions may be four or more or four or less. Moreover, the driver may select a condition in which the switching to the notification screen 200 is performed.

2.5.2.2 Example of Termination Condition

The determining unit 12 determines whether each of display stop conditions is satisfied, for example. When all the display step conditions a re satisfied, the determining unit 12 determines that a termination condition is satisfied, and instructs the image controller 11 to terminate the display of the notification screen 200.

Figures 8, 9:
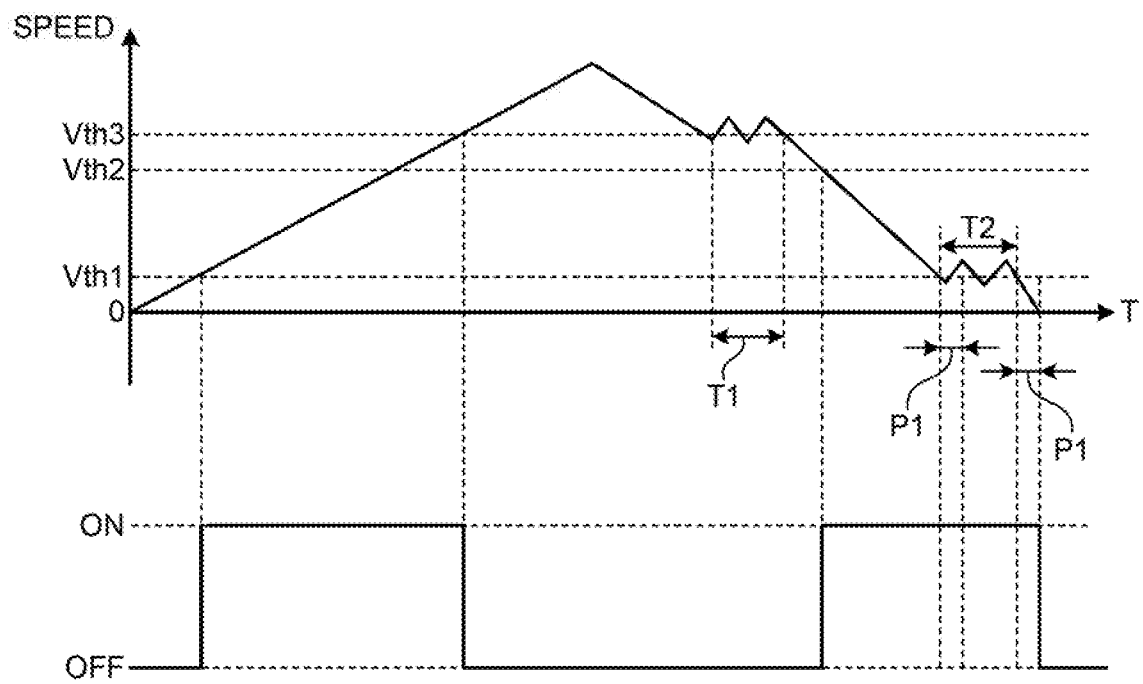
FIG. 8 is a diagram illustrating a stop OR condition table according to the embodiment.
FIG. 9 is a diagram explaining a stop OR condition according to the embodiment.

By using FIGS. 7 to 9, the display stop conditions will be explained. FIG. 7 is a diagram illustrating a display stop condition table that indicates the satisfaction or unsatisfaction of each display stop condition. FIG. 8 is a diagram illustrating a stop OR condition table that indicates the satisfaction or unsatisfaction of a slop OR condition of the display stop conditions. FIG. 9 is a diagram explaining the stop OR condition.

As one of the display stop conditions, the determining unit 12 determines whether the display unit 31 is displaying the notification screen 200 that indicates the detection result of the detector 40. When the display unit 31 is displaying the notification screen 200, the determining unit 12 determines that the display stop condition of "notification screen display" is satisfied, and sets "notification screen display" of the display stop condition table illustrated in FIG. 7 to "1". On the other hand, when the display unit 31 is not displaying the notification screen 200, the determining unit 12 determines that the display stop condition of "notification screen display" is not satisfied, and sets "notification screen display" of the display stop condition table to "0".

The determining unit 12 determines whether the display stop condition is satisfied in accordance with the position of the shire lever. Specifically, when the position of the shift lever is a position other than parking and reverse, for example, the determining unit 12 determines that the display stop condition is satisfied, and sets "other than shift lever P, R" of the display stop condition table to "1". On the other hand, when the shift lever is located at the position of parking or reverse, for example, the determining unit 12 determines that the display stop condition is not satisfied, and sets "other than shift lever P, R" of the display condition table to The determining unit 12 determines whether an OR condition as the display stop condition is satisfied. When at least one of stop OR conditions is satisfied, the determining unit 12 determines that the OR condition is satisfied.

As an example of the display stop condition, the determining unit 12 determines whether a switch of the detector 40 is OFF. When the switch of the detector 40 is OFF, the determining unit 12 determines that the switch of the detector 40 is OFF, and sets "detector switch OFF" of the stop OR condition table illustrated in FIG. 8 to "1".

On the other hand, when the switch of the detector 40 is ON, the determining unit 12 determines that the switch of the detector 40 is not OFF, and sets "detector switch OFF" of the stop OR condition table to "0".

The switch of the detector 40 can be switched by the driver between ON and OFF, for example. Therefore, when the switch of the detector 40 is switched by the driver to OFF, for example, the determining unit 12 determines that the detection of an obstacle is unnecessary and thus the display of the notification screen 200 is terminated.

As an example of the display stop condition, the determining unit 12 determines whether a time in which an obstacle is not detected by the detector 40 exceeds a predetermined time P1. When the obstacle is not detected by the detector 40 for a predetermined time, the determining unit 12 determines that the predetermined time has passed after the obstacle is detected, and sets "No obstacle detection for predetermined time" of the stop OR condition table to "1". On the other hand, when the obstacle is detected within the predetermined time, the determining unit 12 determines that the predetermined time has not passed after the obstacle is detected, and sets "No obstacle detection for predetermined time" of the stop OR condition table to "0".

As described above, when an obstacle is not detected for a predetermined time, the determining unit 12 determines to terminate the display of the notification screen 200 because the obstacle does not exist around the vehicle C.

As an example of display stop condition the determining unit 12 determines whether a time in which the speed of the vehicle C is less than the first speed Vth1 exceeds a predetermined time. When the time in which the vehicle speed is smaller than the first speed Vth1 exceeds the predetermined time, the determining unit 12 sets "vehicle speed below first speed Vth1 for predetermined time" of the stop OR condition table to "1". On the other hand, when the time in which the vehicle speed is smaller than the first speed Vth1 is not more than the predetermined time, the determining unit 12 sets "vehicle speed below first speed Vth1 for predetermined time" of the stop OR condition table to "0".

As an example of the display stop condition, the determining unit 12 determines whether the speed of the vehicle C exceeds a third speed Vth3 faster than the second speed Vth2. When the vehicle speed exceeds the third speed Vth3, the determining unit 12 sets "vehicle speed larger than third speed Vth3" of the stop OR condition table to "1". On the other hand, when the vehicle speed is smaller than the third speed Vth3, the determining unit 12 "vehicle speed larger than third speed Vth3" of the stop OR condition table to "0".

By using FIG. 9, it will be explained about the relationship between the vehicle speed and the determination by the determining unit 12 for the display condition and the display stop condition. In FIG. 9, the case, in which the determining unit 12 displays the notification screen 200, namely, it is determined that the display condition is satisfied, is explained as "ON", and the case, in which the determining unit 12 does not display the notification screen 200, namely, it is determined that the display stop condition is satisfied, is explained as "OFF".

In FIG. 9, the upper part illustrates a time change in the speed of the vehicle C, and the lower part illustrates the determination result of the determining unit 12. As illustrated in the upper part of FIG. 9, when the vehicle speed of the vehicle C is changed and the vehicle speed, is not less than the first speed Vth1, the determining unit 12 determines the state of the notification as "ON", namely, determines to display the notification screen 200. When the vehicle speed exceeds the third speed Vth3, the determining unit 12 determines the state of the notification as "OFF", namely, determines not to display the notification screen 200.

When the vehicle speed is not more than the second speed Vth2, the determining unit 12 determines the state of the notification as "ON", namely, determines to display the notification screen 200. When a time in which the vehicle speed is smaller than the first speed Vth1 runs beyond the predetermined time P1, the determining unit 12 determines the state of the notification as "OFF", namely, determines not to display the notification screen 200.

As described above, a speed (second speed Vth2) at which it is determined that the notification screen 200 is displayed is different from a speed (third speed Vth3) at which it is determined that the display of the notification screen 200 is terminated. Therefore, when the vehicle speed is frequently changed like a time T1 illustrated in FIG. 9, for example, the notification screen 200 cannot be prevented from being frequently switched between start and termination.

When a time in which the vehicle speed is less than the first speed Vth1 is continued for the predetermined time P1, the display of the notification screen 200 is terminated. As a result, when the vehicle speed is frequently changed like a time T2 illustrated in FIG. 9, for example, the notification screen 200 cannot be prevented from being frequently switched between start and termination.

When at least one of the stop OR conditions described above is satisfied, for example, namely, at least one of the stop OR conditions of the stop OR condition table in FIG. 8 is "1", the determining unit 12 determines that the OR condition is satisfied, and sets "OR condition satisfaction" of the display stop condition table as illustrated in FIG. 7 to "1".

When all the display stop conditions described above are satisfied, tor example, namely, all the display stop conditions of the display stop condition table are "1", the determining unit 11 determines that the termination condition is satisfied. In the example illustrated in FIG. 7, because all the display stop conditions are "1", the determining unit 12 determines that the termination condition is satisfied, and instructs the image controller 11 to terminate the notification screen 200.

The case where three conditions are employed as the display stop condition and four conditions are employed as the stop OR condition has been explained. However, the display stop condition and the stop OR condition are not limited to the above case. For example, in a case where the notification screen 200 is displayed on the display unit 31, when an input operation is performed with respect to the navigation device 30, the determining unit 12 may assume that the driver has confirmed the notification screen 200 and determine to terminate the display of the notification screen 200. The number of the display stop conditions and the stop OR conditions may be four or three or more, or may be four or three or less. Alternatively, the driver may select a condition for terminating the notification screen 200.

The case where the determining unit 12 determines to terminate the display of the notification screen 200 when all the display step conditions illustrated in FIG. 7 are satisfied has been explained. However, the present embodiment is not limited to the above. For example, when "other than shift lever P, R" of FIG. 7 is changed to "0", namely, the shift lever is changed to parking or reverse, the determining unit 12 may determine to terminate the display of the notification screen 200 regardless of the satisfaction or unsatisfaction of the OR condition. Alternatively, when the predetermined time has passed after displaying the notification screen 200, the determining unit 12 may determine to terminate the display of the notification screen 200.

2.5.3 Storage Unit

The storage unit 13 stores, for example, the display condition table, the display stop condition table, and the stop OR condition table. Moreover, the storage unit 13 stores information required for the determination of whether the switching condition is satisfied and the determination of whether the termination condition is satisfied, which are performed by the determining unit 12. The storage unit 13 is a semiconductor memory device such as a Random Access Memory (RAM) and a flash memory, or a storage device such as a hard disk and an optical disc.

3. Notification Processing

Next, notification processing performed by the image processing device 10 will be explained. The image processing device 10 executes the notification processing that includes notification start processing and notification termination processing.

3.1 Notification Start Processing

Figure 10:
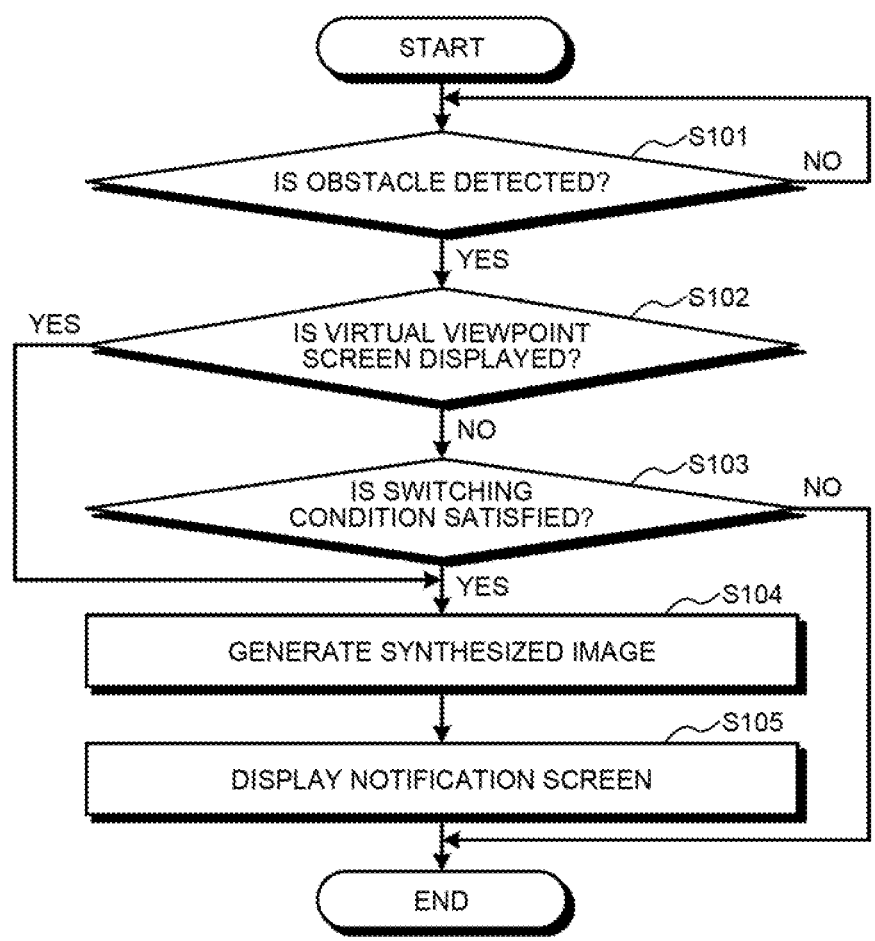
FIG. 10 is a flowchart illustrating notification start processing according to the embodiment.

FIG. 10 is a flowchart illustrating notification start processing that is performed by the image processing device 10. First, the image processing device 10 determines whether the detector 40 detects an obstacle (Step S101). When it is determined that the detector 40 does not detect an obstacle (Step S101: No), the image processing device 10 returns the process to Step S101 to wait for the detection of an obstacle.

On the other hand, when the detector 40 detects an obstacle (Step S101: Yes), the image processing device 10 determines whether a virtual viewpoint screen including the synthesized image 300 is displayed on the display unit 31 (Step S102). When the virtual viewpoint screen including the synthesized image 300 is displayed on the display unit 31 (Step S102: Yes), the image processing device 10 advances the process to Step S104.

When the virtual viewpoint screen including the synthesized image 300 is not displayed on the display unit 31 (Step S102: No), the image processing device 10 determines whether a switching condition is satisfied (Step S103). When the switching condition is not satisfied (Step S103: No), the image processing device 10 determines that the switching to the notification screen 200 is unnecessary, and terminates the notification start processing.

When the switching condition is satisfied (Step S103: Yes), the image processing device 10 generates the synthesized image 300 (Step S104), and causes the display unit 31 to display the notification screen 200 obtained by superimposing a notification image on the generated synthesized image 300 (Step S105).

At timing at which the display condition is changed, for example, the vehicle speed of the vehicle C is changed or the position of the shift lever is changed, the image processing device 10 previously updates the display condition table, and performs the determination on the satisfaction or unsatisfaction of the switching condition by referring to the display condition table in Step S103. Alternatively, the image processing device 10 may determine whether the switching condition is satisfied by determining all the display conditions at timing at which Step S103 is executed.

The image processing device 10 may exchange Step S102 for Step S103, or may simultaneously execute Steps S102 and S103.

3.2 Notification Termination Processing

Figure 11:
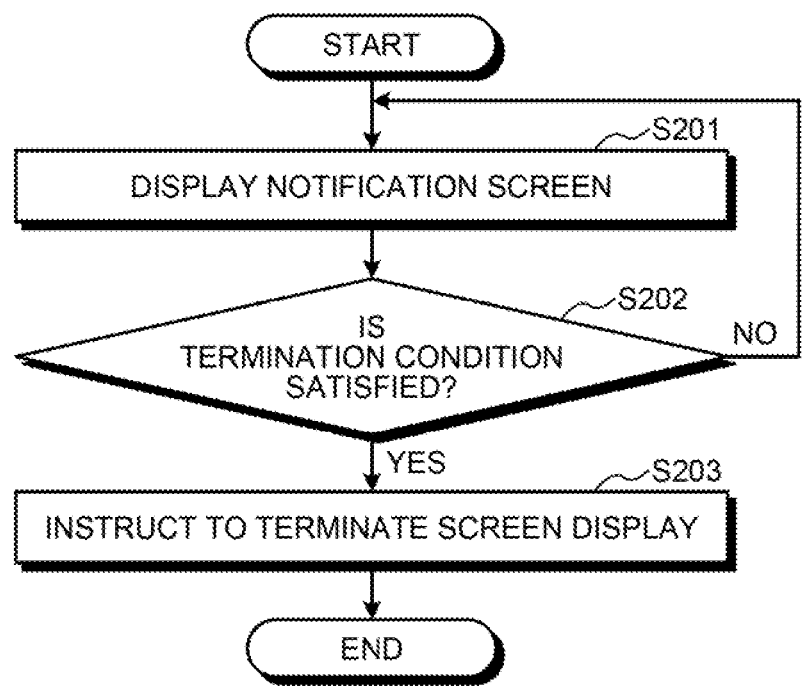
FIG. 11 is a flowchart illustrating notification termination processing according to the embodiment.

FIG. 11 is a flowchart illustrating notification termination processing that is performed by the image processing device 10. The image processing device 10 executes the notification termination processing after executing the notification start processing.

First, the image processing device 10 continues to display the notification screen 200 on the display unit 31 (Step S201). Next, the image processing device 10 determines whether a termination condition is satisfied (Step S202). When it is determined that the termination condition is not satisfied (Step S202: No), the image processing device 10 returns the process to Step S201, and continues to display the notification screen 200 on the display unit 31.

On the other hand, when it is determined that the termination condition is satisfied (Step S202: Yes), the image processing device 10 instructs the display unit 31 to terminate the display of the notification screen 200 (Step S203). Upon receiving an instruction for terminating the display of the notification screen 200 from the image processing device 10, the display unit 31 displays for example the screen just before displaying the notification screen 200. Alternatively, the image processing device 10 may determine an image to be displayed on the display unit 31.

At timing at which the display stop condition and the stop OR condition are changed, for example, the vehicle speed of the vehicle C is changed or the position of the shift lever is changed, the image processing device 10 previously updates the display stop condition table and the stop OR condition table, and performs the determination on the satisfaction or unsatisfaction of the termination condition by referring to the display stop condition table in Step S202. Alternatively, the image processing device 10 may execute Step S202 at timing at which the display stop condition table and the stop OR condition table are updated. Alternatively, the image processing device 10 may determine whether the termination condition is satisfied by determining all the display stop conditions at timing at which Step S202 is executed.

As described above, in a case where a screen other than the virtual viewpoint screen is displayed on the display unit 31, the image processing device 10 changes the display of the display unit 31 to the notification screen 200 when the switching condition to the notification screen 200 is satisfied. As a result, the image processing device 10 can appropriately notify a driver of an obstacle in the case of requiring a notification.

4. Alternative Example

In the embodiment described above, although the image processing device 10 determines whether a driver is notified of an obstacle after the detector 40 detects the obstacle, the present embodiment is not limited to the above. For example, when the display unit 31 does not display a virtual viewpoint screen including the synthesized image 300 and a switching condition is satisfied, the image processing device 10 determines that the present mode is a notification mode for notifying a driver of an obstacle. The image processing device 10 notifies a driver of an obstacle when receiving the detection notification of the obstacle from the detector 40 in a detection mode.

As described above, because the image processing device 10 previously switches between notification and detection modes, the image processing device 10 does not need to determine the satisfaction or unsatisfaction of the switching condition at timing at which an obstacle is detected, and thus can immediately notify the driver of the obstacle at timing at which the detector 40 detects the obstacle.

In a case where the image processing device 10 is in the notification mode, the image processing device 10 terminates the detection mode when the notification screen 200 is displayed on the display unit 31, namely, it is determined that the display stop conditions excluding the condition of "notification screen display" of FIG. 7 are satisfied.

As described above, because the detection mode is terminated when the display stop conditions different from the display condition are satisfied, it is possible to restrain the frequent switching between the start and termination of the detection mode in a short period of time.

According to an aspect of an embodiment, it is possible to provide an image processing device and an image processing method, which can appropriately notify a driver of a vehicle of an obstacle.

What is claimed is:

1. An image processing device comprising:
   one or more processors programmed to:
   receive sensor detection results from one or more sensors mounted on a vehicle; and
   when, based on the received sensor detection results of the one or more sensors, an obstacle is detected around the vehicle:
   determine whether a display switching condition has been satisfied; and
   in response to the display switching condition being satisfied, cause a display to switch from a first screen to a second screen that is different from the first screen, wherein:
   the second screen is an obstacle detection notification screen that superimposes an obstacle detection notification image onto a virtual viewpoint image, which is a synthesized image that is from a virtual viewpoint of viewing a perimeter of the vehicle based on one or more images from one or more image capturing devices,
   the display switching condition includes a first condition that is satisfied upon determining that there is no operation by the user with an input operation interface with respect to the display for a predetermined period of time, and
   the predetermined period of time is: (i) a predetermined period of time after the one or more sensors has detected the obstacle, or (ii) a predetermined period of time before the one or more sensors has detected the obstacle.

2. The image processing device according to claim 1, wherein the display switching condition includes a second condition that is satisfied upon determining that a speed of the vehicle is within a predetermined speed range and more than zero, and the second condition, which is satisfied upon determining that the speed of the vehicle is within the predetermined speed range and more than zero, is satisfied by determining that the speed of the vehicle is not less than a first speed, which is higher than 0 km/h, and is not greater than a second speed, which is higher than the first speed.

3. The image processing device according to claim 2, wherein the one or more processors are further configured to: instruct the display to terminate display of the second screen when the speed of the vehicle exceeds a third speed that is higher than the second speed during the display of the second screen.

4. The image processing device according to claim 2, wherein the one or more processors are further configured to instruct the display to terminate display of the second screen when a period of time in which the speed of the vehicle is less than the first speed exceeds a predetermined period of time that is during the display of the second screen.

5. The image processing device according to claim 1, wherein the one or more processors are further configured to: instruct the display to terminate display of the second screen when a period of time in which the obstacle is not detected exceeds a predetermined period of time that is during the display of the second screen.

6. An image processing device comprising:
   one or more processors programmed to:
   receive sensor detection results from one or more sensors mounted on a vehicle; and when, based on the received sensor detection results of the one or more sensors, an obstacle is detected around the vehicle:
determine whether a display switching condition has been satisfied; and
in response to the display switching condition being satisfied, cause a display to switch from a first screen to a second screen that is different from the first screen, wherein:
the second screen is an obstacle detection notification screen that superimposes an obstacle detection notification image onto a virtual viewpoint image, which is a synthesized image that is from a virtual viewpoint of viewing a perimeter of the vehicle based on one or more images from one or more image capturing devices, and
the display switching condition includes a condition that is satisfied upon determining that the first screen does not include a television broadcasting signal image.

7. An image processing method comprising:
receiving, by a processor, sensor detection results from one or more sensors mounted on a vehicle; and
when, based on the received sensor detection results of the one or more sensors, an obstacle is detected around the vehicle:
determining, by the processor, whether a display switching condition has been satisfied; and
in response to the display switching condition being satisfied, causing, by the processor, a display to switch from a first screen to a second screen that is different from the first screen, wherein:
the second screen is an obstacle detection notification screen that superimposes an obstacle detection notification image onto a virtual viewpoint image, which is a synthesized image that is from a virtual viewpoint of viewing a perimeter of the vehicle based on one or more images from one or more image capturing devices,
the display switching condition includes a condition that is satisfied upon determining that there is no operation by the user with an input operation interface with respect to the display for a predetermined period of time, and
the predetermined period of time is: (i) a predetermined period of time after the one or more sensors has detected the obstacle, or (ii) a predetermined period of time before the one or more sensors has detected the obstacle.

8. An image processing method comprising:
receiving, by a processor, sensor detection results from one or more sensors mounted on a vehicle; and
when. based on the received sensor detection results of the one or more sensors, an obstacle is detected around the vehicle:
determining, by the processor, whether a display switching condition has been satisfied; and
in response to the display switching condition being satisfied, causing, by the processor, a display to switch from a first screen to a second screen that is different from the first screen, wherein:
the second screen is an obstacle detection notification screen that superimposes an obstacle detection notification image onto a virtual viewpoint image, which is a synthesized image that is from a virtual viewpoint of viewing a perimeter of the vehicle based on one or more images from one or more image capturing devices, and
the display switching condition includes a condition that is satisfied upon determining that the first screen does not include a television broadcasting signal image.

* * * * *